Nov. 5, 1940.  G. H. JENTZEN  2,220,719
ANIMATED DISPLAY METHOD AND MEANS
Filed June 30, 1938
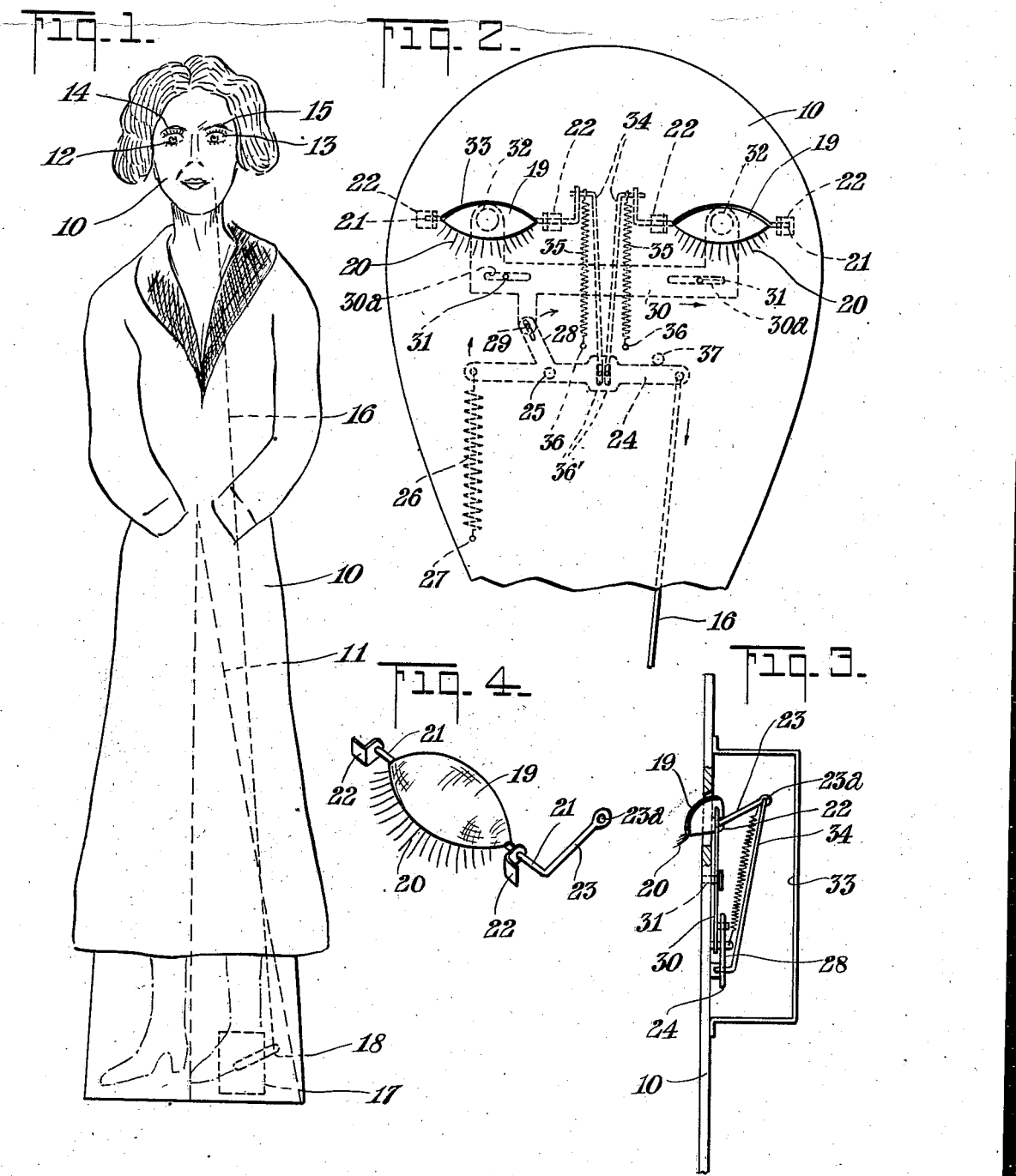
INVENTOR.
GEORGE H. JENTZEN
BY
Ray Belmont Whitman
ATTORNEY.

Patented Nov. 5, 1940

2,220,719

UNITED STATES PATENT OFFICE 2,220,719

ANIMATED DISPLAY METHOD AND MEANS

George H. Jentzen, Jersey City, N. J.

Application June 30, 1938, Serial No. 216,670

4 Claims. (Cl. 46—167)

This invention relates to animated display methods and means and more especially to a window display advertising device, or other attraction-compelling device on the picture or a model of a human face.

An object of the invention is to provide means, preferably actuated mechanically by remote control, for simulating a lifelike appearance in a reproduction of the face of a human being or other animal having eyes, whereby the eyes may simulate in likelike manner and normal movements as regards the movement of the pupil or eyeball and also the movement—either in conjunction with the former or independently thereof—of the eyelid or lids and the eyelash or lashes.

Another object is to provide such a device for use in display advertising on cardboard cut-outs of the human figure, whether of men, women, boys, girls, infants, babies, dolls, animal heads and forms, for various lines of business. This device is also adapted for use for mannequins, dolls, poster displays, electric signs, comic stunts, the heads of ventriloquists' dolls, millinery heads for the display of hats, and other like uses.

A further object is to provide a device associated with cut-out portions of the reproduction of a face at the position of the eyes, and which will simulate in likelike manner the blinking or winking of one or both eyes in every position and all directions, and permitting eyelashes and eye-balls to be moved in any desired position. This device is useful for stuffed animals, birds, fish, and insects, and regardless of whether the eyes and eyelashes are attached to the head or detached therefrom.

All these and other objects as suggested hereinbelow are attained by the method and means now to be described, and illustrated in the accompanying drawing, in which—

Figure 1 is a front perspective view of a cut-out figure of a girl such as is commonly used in window display advertising, and showing the cut-out eyes with their animated lids and lashes and pupils in operating position, and the position of the mechanical means at the base of the figure, in back, for actuating these parts from a distance and out of sight of the viewer.

Fig. 2 is an enlarged front elevational view of the face portion of Fig. 1, showing the operating mechanism by which both the lids or lashes and the eye pupils are made to move in any prearranged sequence desired by the movement of one operating member or string usually leading downwardly to the mechanically-operated device positioned on the back of the figure below.

Fig. 3 is a side elevational view of the device shown in Fig. 2 and showing somewhat diagrammatically the essential operating features of this invention.

And Fig. 4 is an enlarged perspective view of the upper eyelid together with its eyelash and operating lever and pivots by which it is caused to be moved in likelike manner through the eye opening of the cardboard figure.

Like numerals refer to like parts throughout the several views.

The invention as shown applies to a human figure 10 cut from stiff cardboard to the outline for instance of a girl full length. A foldable piece of cardboard 11 extending from the floor part way up the figure and hingedly attached thereto serves as a prop to hold the figure substantially upright when in use, somewhat like the third leg of an easel.

Eye openings 12, 13 are cut from the face at the position of the eyes around the line of the eye sockets. The eyebrows 14, 15 are painted on the flat surface of the cardboard, or in any other realistic manner. An operating member 16 extends up the back of the figure to a position close to the eye openings, and its lower end is connected to suitable operating mechanism such as a spring motor or electric motor 17 adapted to move up and down a crank member 18 for the purpose of moving member 16 in one or both directions.

Each upper eyelid 19, Fig. 4, is formed and decorated in realistic manner to the proper size to fit into the upper openings of the eye spaces in the face and each lid is equipped along its outer edge with a realistic eyelash member 20 made of projecting hair or bristles, suitably spaced to attain the realistic effect. Member 19 has oppositely-disposed pivots 21, 21 adapted to be rotated in openings in bracket members 22, 22 suitably fastened to the back of member 10 in the positions shown in Fig. 2. One of the pivots 21 terminates in a right angular crank-like member 23 terminating at its outer end in an eye portion 23a which connects with the operating means in manner as hereafter described.

String member 16 is attached at the upper end to one end of an operating link 24 which is pivoted at 25 to the back surface of member 10, preferably in the position shown in Figs. 2 and 3. The opposite end of member 24 is attached to a fine spiral spring 26 which extends downwardly as shown and terminates at 27 where it is attached to a bracket extending outwardly from the back surface of member 10, a distance sufficient to permit spring 26 to extend and compress without interference.

Extending upwardly and somewhat to one side of pivot point 25 is an operating arm 28 integral with member 24 and adapted to have its upper end move in the direction of the arrow when string 16 is caused to move downwardly, as through motor 17 and its operating link 18. This member 28 has a longitudinal slot near its upper end through which a connecting pin 29 projects. Pin 29 is attached to an eye-operating-member 30 at the lower end of a downwardly projecting lug portion integral therewith, and member 30 is slidably positioned along the back surface of member 10 being constrained to move in a horizontal path by virtue of slots 30a, 30a through which supporting pins 31, 31 pass; and these pins 31, 31 may have flat heads (not shown) to prevent member 30 from moving out of the desired position. The opposite ends of member 30 terminate in upstanding portions on the front surface of each of which is painted a simulation of an eye pupil 32, 32. It will of course be understood that the area of these terminating ends of member 30 surrounding the pupils is painted on the forward face with a color similar to the background color of the eye opening which background color may be on the visible inner surface of a surrounding box 33 as shown in Fig. 3.

Upwardly extending connecting links 34, 34 are pivotally attached to member 24 at closely adjacent points as shown in Fig. 2 and their upper ends terminate in hook portions facing away from one another and adapted to enter the eye portions 23a, 23a of the cranks 23 attached to the eyelid members. Suitable fine springs 35, 35 are attached from said hook portions to fastening points 36, 36 on the back of member 10, for the purpose of taking up any lost motion in the operating parts.

Thus it will be seen that when string 16 is moved downwardly in the direction of the arrow, member 24 pivots around 25 and spring 26 is extended and rods 34, 34 are pulled downwardly and they in turn pull cranks 23, 23 downwardly to rotate eyelids 19, 19 and eyelashes 20, 20 upwardly and inwardly to wink or blink the eyes, as the saying is. At the same time member 28 causes member 30 to slide to the right or in the direction of the arrow and carry with it pupils 32, 32 to simulate the shifting of said pupils laterally to one side or the other of the central position to thus simulate the appearance of the eyes following an object from one side to another.

By means of a slotted or other loose connection 36, Fig. 2, in one or both of the connections between members 34 and member 24 it is possible to delay the action or movement of one or both eyelids and lashes with respect to the movement of the pupils of the eyes. Or this loose connection may be made in the same manner with pivot 29 so the eyelids move before the eyes start their movement.

Moreover, by changing the position or direction of slots 30a, 30a to an upwardly slanted position or an arc-shaped curve, and arranging the slot and its member 28 to slant in relation to member 24 to conform, it is then impossible to have the pupils move laterally across the face, but both will move laterally and vertically or up and across and down, and then reverse. Thus with this simple mechanism a wide variety of realistic effects may be attained in any desired combination of the movement of upper lid and pupil of each or both eyes, either together or separate.

It should be noted that stop member 37 positioned as in Fig. 2 prevents spring 26 from moving the opposite end of member 24 beyond its desired upper position.

Having now described the invention, what is claimed as new and for which Letters Patent of the United States is desired, is:

1. An eye-lid and eye-ball device adapted for use in the eye socket of a doll or face reproduction, including a slidingly-movable eye-ball and a pivotably-movable combined eye-lid-and-lash, remote-control power means for operating both the lid and the ball, and means for delaying the operation of the one in reference to the other.

2. In combination, a power source, an operating member connected thereto and adapted to take intermittent motion therefrom, a pivoted lever to which the other end of the operating member is connected, a spring attached to the other end of the lever, connecting-rod members pivotally attached on the pivoted lever between its pivot and end of operating member, and eyelid members mounted on horizontal pivots in normally-closed position and having up-standing cranks attached to the connecting-rod members to be turned and reversed through a partial revolution thereby.

3. In combination, a power source, an operating member connected thereto and adapted to take intermittent motion therefrom, a pivoted lever to which the other end of the operating member is connected, a spring attached to the other end of the lever, connecting-rod members pivotally attached on the pivoted-lever between its pivot and end of operating member, and eyelid members mounted on horizontal pivots in normally-closed position and having up-standing cranks attached to the connecting-rod members to be turned and reversed through a partial revolution thereby, there being an arm on the pivoted lever projecting upwardly near its pivot portion such that its upper end is moved somewhat horizontally, and an eye-pupil operating member pivotally connected to said arm to be moved thereby.

4. An apparatus for imparting a realistic appearance to a reproduction of a face having cut-out eye portions therein, including a curved lid-and-lash member swingably attached in each eye portion, a single-plane duplex eye member slidably attached back of said eye portions, and means operated from a common power source for opening or raising the lid-and-lash members and laterally moving the duplex eye member in one direction against the tension of a spring, said spring being arranged to move said members in an opposite direction after release of said power source and to a closed position of the lid-and-lash member and a central position of the duplex eye member.

GEORGE H. JENTZEN.